United States Patent
Ahn (10) Patent No.: US 11,390,299 B2
(45) Date of Patent: Jul. 19, 2022

(54) AUTONOMOUS DRIVING SYSTEM AND METHOD OF VEHICLE USING V2X COMMUNICATION

(71) Applicants: Hyundai Motor Company, Seoul (KR); Kia Motors Corporation, Seoul (KR)

(72) Inventor: Seung Jai Ahn, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 37 days.

(21) Appl. No.: 17/009,354

(22) Filed: Sep. 1, 2020

(65) Prior Publication Data

US 2021/0179135 A1  Jun. 17, 2021

(30) Foreign Application Priority Data

Dec. 17, 2019 (KR) .................... 10-2019-0168745

(51) Int. Cl.
| | | |
|---|---|---|
| *B60W 60/00* | (2020.01) | |
| *H04W 4/44* | (2018.01) | |
| *G08G 1/16* | (2006.01) | |
| *G06V 20/58* | (2022.01) | |

(52) U.S. Cl.
CPC ......... *B60W 60/001* (2020.02); *G06V 20/584* (2022.01); *G08G 1/163* (2013.01); *H04W 4/44* (2018.02); *B60W 2556/50* (2020.02); *B60W 2756/10* (2020.02)

(58) Field of Classification Search
CPC .......... G01C 21/3415; B60W 2555/60; B60W 2556/50; B60W 2756/10; B60W 30/10; B60W 30/14; B60W 30/18154; B60W 40/02; B60W 60/001; G06K 9/00825; G08G 1/04; G08G 1/087; G08G 1/096; G08G 1/096725; G08G 1/096741; G08G 1/096783; G08G 1/163; H04L 67/12; H04W 4/44; H04W 4/90
See application file for complete search history.

(56) References Cited

U.S. PATENT DOCUMENTS

| | | | | |
|---|---|---|---|---|
| 2016/0148507 | A1* | 5/2016 | Pittman | G06Q 30/0255 340/917 |
| 2017/0221366 | A1* | 8/2017 | An | G08G 1/096783 |
| 2019/0088148 | A1* | 3/2019 | Jacobus | B60W 10/18 |
| 2019/0251838 | A1* | 8/2019 | Bernhardt | G08G 1/096822 |
| 2020/0084202 | A1* | 3/2020 | Smith | H04L 67/28 |
| 2020/0125870 | A1* | 4/2020 | Nishimura | G08G 1/0133 |
| 2020/0178198 | A1* | 6/2020 | Ding | G07C 5/008 |
| 2020/0189563 | A1* | 6/2020 | Sakai | B60W 20/12 |

(Continued)

FOREIGN PATENT DOCUMENTS

CN 110285981 A * 9/2019

*Primary Examiner* — Babar Sarwar
(74) *Attorney, Agent, or Firm* — Slater Matsil, LLP (57) ABSTRACT

An autonomous driving method of a vehicle using V2X communication includes acquiring signal information about a plurality of traffic lights installed at an intersection, determining a signal error in at least one of the plurality of traffic lights by comparing signal information about at least two traffic lights intersecting or facing each other among the acquired signal information, and resetting a driving path of a host vehicle depending on a result of the determination.

20 Claims, 8 Drawing Sheets

(56) References Cited

U.S. PATENT DOCUMENTS

| | | | |
|---|---|---|---|
| 2020/0193821 A1* | 6/2020 | Kawaharada | G05D 1/0088 |
| 2020/0211375 A1* | 7/2020 | Vig | G01S 13/89 |
| 2020/0242922 A1* | 7/2020 | Dulberg | G08G 1/164 |
| 2020/0410263 A1* | 12/2020 | Gao | G06K 9/00798 |
| 2021/0027076 A1* | 1/2021 | Hayashi | G08G 1/04 |
| 2021/0316750 A1* | 10/2021 | Jo | B60W 40/08 |

* cited by examiner

|  | LEFT-TURN SIGNAL | GREEN SIGNAL |
|---|---|---|
| G1 { TRAFFIC LIGHT 1($TL_1$) | A | B |
| TRAFFIC LIGHT 3($TL_3$) | C | D |
| G2 { TRAFFIC LIGHT 2($TL_2$) | E | F |
| TRAFFIC LIGHT 4($TL_4$) | G | H |

AUTONOMOUS DRIVING SYSTEM AND METHOD OF VEHICLE USING V2X COMMUNICATION

CROSS-REFERENCE TO RELATED APPLICATIONS

This application claims priority to Korean Patent Application No. 10-2019-0168745, filed on Dec. 17, 2019, which application is hereby incorporated herein by reference.

TECHNICAL FIELD

The present invention relates to an autonomous driving system and method of a vehicle using V2X communication.

BACKGROUND

A conventional autonomous driving system recognizes traffic lights mainly using a camera and then determines whether or not to continue driving in order to pass through a crosswalk or an intersection at which the traffic lights are present. However, if signals are recognized only using the camera, although the recognition performance of the camera is perfect, when a traffic light is blocked by a vehicle in front of a host vehicle or when the corresponding traffic light is blocked by the host vehicle due to the position of the host vehicle, the signal state of the traffic light may not be detected, or may be mistaken for another signal.

In another method, a V2X communication apparatus installed at a traffic light may transmit signal information to the host vehicle. However, the autonomous driving system may not detect information about the lanes from which and to which the host vehicle moves simply through transmission of the signal information. Further, since the signal information input through the V2X communication apparatus uses ground truth (GT) without separate verification, if the signal information contains an error, a major accident may happen at an intersection.

SUMMARY

Accordingly, the present invention is directed to an autonomous driving system and method of a vehicle using V2X communication that substantially obviate one or more problems due to limitations and disadvantages of the related art. Particular embodiments relate to an autonomous driving system and method of a vehicle in which a signal error in traffic lights installed at an intersection is determined and, in response thereto, a driving path for bypassing the intersection is reset.

An embodiment of the present invention provides an autonomous driving system and method of a vehicle in which an error in signal information of traffic lights applied through V2X communication may be autonomously determined and an alternative path for bypassing an intersection may be generated.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of the invention, as embodied and broadly described herein, an autonomous driving method of a vehicle using V2X communication includes acquiring signal information about a plurality of traffic lights installed at an intersection, determining a signal error in at least one of the plurality of traffic lights by comparing signal information about at least two traffic lights intersecting or facing each other among the acquired signal information, and resetting a driving path of a host vehicle depending on a result of the determination.

In the acquiring the signal information, the signal information may be received from roadside equipment around the host vehicle through V2X communication.

In the determining the signal error, the signal error may be determined when at least one of a plurality of traffic lights facing each other in a driving direction of the host vehicle outputs a green signal or a left-turn signal and at least one of a plurality of traffic lights facing each other in a direction intersecting the driving direction of the host vehicle outputs the green signal or the left-turn signal.

In the determining the signal error, the signal error may be determined when one of a plurality of traffic lights facing each other in a driving direction of the host vehicle outputs a left-turn signal and a remaining one outputs a green signal.

In the determining the signal error, the signal error may be determined when one of a plurality of traffic lights facing each other in a direction intersecting a driving direction of the host vehicle outputs a left-turn signal and a remaining one outputs a green signal.

The resetting the driving path of the host vehicle may include receiving path information of peripheral vehicles approaching the intersection, when the signal error in the at least one of the plurality of traffic lights is determined, and analyzing the possibility of a collision between the host vehicle and the peripheral vehicles based on the received path information of the peripheral vehicles and generating an alternative path for bypassing the intersection.

In the generating the alternative path, information about a road along which the host vehicle is currently driving may be acquired through a GPS receiver and a precise map database mounted in the host vehicle, and a path along which the host vehicle is capable of being driven to a predetermined destination may be reset by searching for a point at which to bypass the intersection adjacent to the host vehicle based on the road information.

The point at which to bypass the intersection may include a point in the intersection at which the host vehicle is capable of making at least one of an unprotected U-turn or a right-turn.

The autonomous driving method may further include generating an emergency path by changing the destination to a safety zone, when the host vehicle is not movable to the searched point at which to bypass the intersection.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF ILLUSTRATIVE EMBODIMENTS

Reference will now be made in detail to the preferred embodiments of the present invention, examples of which are illustrated in the accompanying drawings. However, the disclosure of the invention is not limited to the embodiments set forth herein and may be variously modified. In the drawings, in order to clearly describe embodiments of the present invention, descriptions of elements which are not related to the embodiments of the present invention are omitted, and the same or similar elements are denoted by the same reference numerals even though they are depicted in different drawings.

In addition, in the following description of the embodiments, the terms "first", "second", etc. may be used to describe various elements, but do not limit these elements. It will be understood that these terms are used only to discriminate one element from other elements, and do not limit the nature, sequence or order of the corresponding element. It will be understood that terms which are specially defined in consideration of the configurations and functions of the embodiments are used only to describe the embodiments, and do not limit the scope of the embodiments.

It will be understood that the terms used in the following description of the embodiments are used only to describe the embodiments and do not limit the scope of the embodiments. It will be understood that a singular expression of an element encompasses a plural expression of the element unless stated otherwise. In the following description of the embodiments, the terms "including", "having", etc. will be interpreted as indicating the presence of one or more other characteristics, numbers, steps, operations, elements or parts stated in the specification or combinations thereof, and do not exclude presence of characteristics, numbers, steps, operations, elements, parts or combinations thereof, or possibility of adding the same, unless stated otherwise.

In the following description of the embodiments, all terms including technical or scientific terms have the same meanings as generally understood by those skilled in the art to which the present invention pertains, unless defined otherwise. Further, in the following description of the embodiments, generally used terms, such as terms defined in dictionaries, will be interpreted as having meanings coinciding with contextual meanings in the related art, and are not to be interpreted as having ideal or excessively formal meanings unless defined clearly.

Hereinafter, an autonomous driving system of a vehicle according to embodiments of the present invention will be described with reference to the accompanying drawings.

Figure 1:
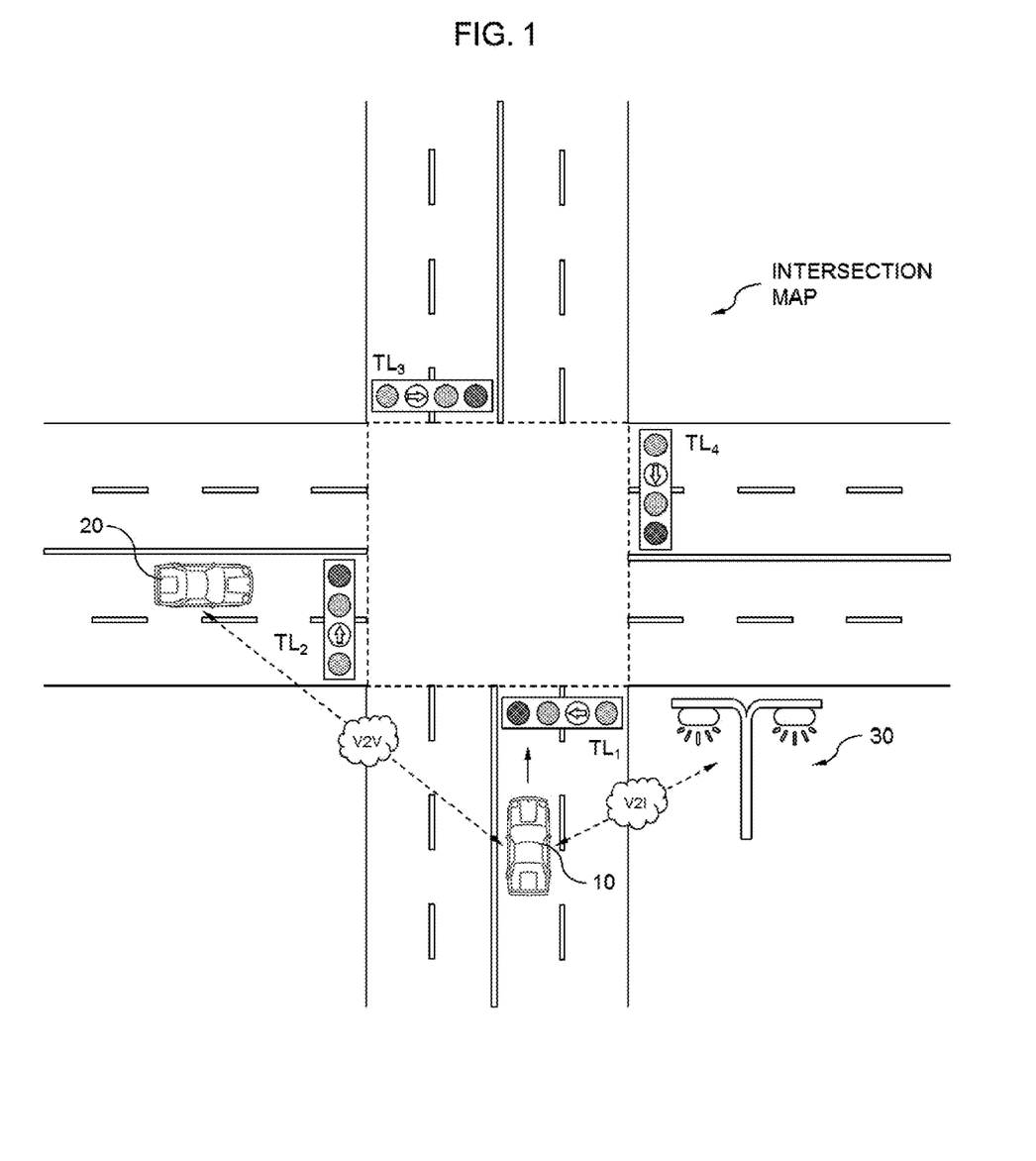
FIG. 1 is an exemplary view illustrating an intersection environment in which an autonomous driving system of a vehicle using V2X communication according to one embodiment of the present invention is operated.

FIG. 1 is an exemplary view illustrating an intersection environment in which an autonomous driving system of a vehicle using V2X communication according to one embodiment of the present invention is operated.

Referring to FIG. 1, an autonomous driving system of a vehicle using V2X communication (hereinafter, referred to as an 'autonomous driving system') according to one embodiment of the present invention includes a communication interface which supports Vehicle to X (V2X) communication, so as to acquire driving environment and road environment information through communication with roadside equipment 30 installed at a roadside and peripheral vehicles 20 located within a designated distance from a host vehicle 10.

"V2X", in which "X" stands for everything, i.e., Infrastructure/Vehicle/Nomadic device, etc., refers to all types of communication methods which are applicable to vehicles, and generally means specific communication technology which may realize a 'connected vehicle' or a 'networked vehicle'. Here, V2X communication may be roughly classified into three categories, i.e., Vehicle-to-Infrastructure (V2I) communication, Vehicle-to-Vehicle (V2V) communication, and Vehicle-to-Nomadic devices (V2N) communication, and recently it has come to be expected that other types of categories will be added to V2X communication.

As such, the autonomous driving system recognizes a driving environment, a road environment, etc. using V2X communication, and generates a driving path for avoiding a collision with a peripheral vehicle 20 by determining a signal error in traffic lights installed at an intersection. Therefore, a detailed description of the configuration of the autonomous driving system will be described with reference to FIG. 2.

Figure 2:
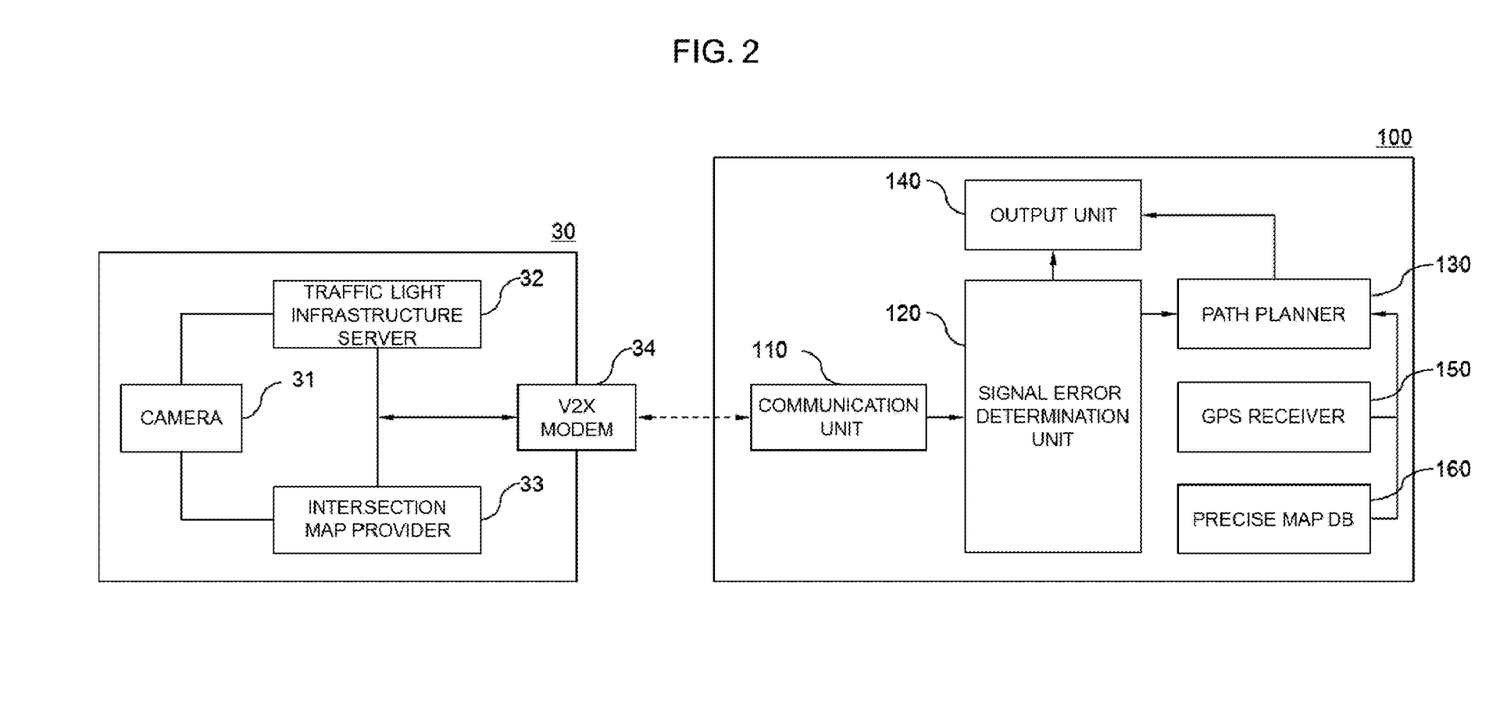
FIG. 2 is a block diagram illustrating the configuration of the autonomous driving system according to one embodiment of the present invention.

FIG. 2 is a block diagram illustrating the configuration of the autonomous driving system according to one embodiment of the present invention.

Referring to FIGS. 1 and 2, an autonomous driving system 100 according to embodiments of the present invention may be installed in the host vehicle 10, and acquire traffic light information about each of a plurality of traffic lights installed at the intersection and information about a road around the intersection from the roadside equipment 30 through V2X communication.

The roadside equipment 30 may include a camera 31, a traffic light infrastructure server 32, an intersection map provider 33 and a V2X modem 34. However, this configuration of the roadside equipment 30 is exemplary, and the roadside equipment 30 may omit at least one of the above-described elements or may additionally include other elements.

The camera 31 photographs vehicles driving around the intersection or a crosswalk at which traffic lights are present, and provides an acquired image to the traffic light infrastructure server 32 and the intersection map provider 33.

The traffic light infrastructure server 32 collects traffic light information output from the plurality of traffic lights corresponding to entry directions to the intersection, and provides the collected traffic light information to the host vehicle 10 provided with the autonomous driving system 100 using the V2X modem 34. Here, the traffic light information includes IDs $TL_1$, $TL_2$, $TL_3$ and $TL_4$ and kinds (i.e., a longitudinal type, a transverse type, a three-way type, a four-way type, etc.) of the traffic lights corresponding to the entry directions to the intersection, and signal states, which are turned on (i.e., a red signal, a yellow signal, a left-turn signal, a green signal, etc.), of the traffic lights, and serves to control traffic flow by allocating priority of passage between vehicles entering the intersection.

The intersection map provider 33 provides an intersection map, in which the traffic lights and a road network structure (link IDs of entry/exit lanes) around the intersection are linked to the host vehicle 10 provided with the autonomous driving system 100 using a map database (not shown). Here, the intersection map may include road information, including road position information, road shape information, progress direction information, intersection information, road width information, speed limit information, etc.

Further, the intersection map provider 33 may receive path information of all vehicles (hereinafter, referred to as 'peripheral vehicles') which are recognized at the intersection via the V2X modem 34. Here, the path information may include local paths in some sections for passing through the intersection among global paths of the peripheral vehicles approaching the intersection, and the intersection map provider 33 may provide the path information to the host vehicle 10 provided with the autonomous driving system 100.

The V2X modem 34 broadcasts the traffic light information and the intersection map (including the road information) collected through the traffic light infrastructure server 32 and/or the intersection map provider 33, and path information of the peripheral vehicles approaching the intersection to the host vehicle 10 provided with the autonomous driving system 100.

The autonomous driving system 100 may acquire the signal information of each of the plurality of traffic lights installed at the intersection from the roadside equipment 30 using V2X communication, determine a signal error in the traffic lights depending on a predetermined algorithm based on the acquired signal information, and reset a driving path of the host vehicle 10 depending on a result of the determination.

The autonomous driving system 100 may include a communication unit no, a signal error determination unit 120, a path planner 130, and an output unit 140, and may further include a GPS receiver 150 and a precise map database (DB) 160 provided therein.

The communication unit 110 includes a communication interface which supports V2X communication. Here, the communication unit no may include a communication interface which supports V2V communication and a communication interface which supports V2I communication, or include one unit into which the V2V communication interface and the V2I communication interface are integrated.

The communication unit 110 may acquire the traffic light information and the intersection map (including the road information) from the traffic light infrastructure server 32 and/or the intersection map provider 33 in the roadside equipment 30 and the path information of the peripheral vehicles 20 approaching the intersection using the V2I communication interface (not shown). Further, the communication unit no may acquire the driving information including the position information, driving direction information, speed information, etc. of the peripheral vehicles 20 using the V2V communication interface (not shown).

The signal error determination unit 120 may construct a traffic light database (DB), in which the respective traffic light IDs $TL_1$, $TL_2$, $TL_3$ and $TL_4$ and corresponding signal information A to H are arranged in rows and columns, using the traffic light information acquired from the roadside equipment 30 (with reference to FIGS. 3A and 3B and FIGS. 5A and 5B), and determine a signal error in at least one of the plurality of traffic lights installed at the intersection depending on the predetermined algorithm based on the traffic light DB. Here, the signal error means a state in which priority of passage is not properly allocated between vehicles entering the intersection and thus there is a high possibility that a collision may occur.

Here, the traffic light IDs (i.e., row items) may be grouped based on a predetermined reference, and the signal information (i.e., column items) may be processed into binary-type digital signals depending on whether or not a left-turn signal and/or a green signal is turned on or off.

For example, the signal error determination unit 120 groups the respective traffic light IDs so as to extract at least two traffic lights intersecting or facing each other from among the plurality of traffic lights, and processes the signal information by converting the signal information into digital signals by allocating 1 to the traffic light when the left-turn signal and/or the green signal is turned on and allocating 0 to the traffic light when the left-turn signal and/or the green signal is turned off, based on signal states of the traffic lights which are turned on (i.e., the red signal, the yellow signal, the left-turn signal, the green signal, etc.).

In order to describe the operation of the signal error determination unit 120 in more detail, the plurality of traffic lights installed at the intersection will be assumed below based on the intersection map shown in FIG. 1, and the predetermined algorithm for determining a signal error will be described below with reference to FIGS. 3A to 6.

As shown in FIG. 1, first to fourth traffic lights $TL_1$-$TL_4$ are installed in respective entry directions to the intersection in the intersection map, and in this case, the first traffic light $TL_1$ is located in front of the vehicle (i.e., the host vehicle) 10, and the second traffic light $TL_2$ is located at the left side of the intersection based on the position of the host vehicle 10. Further, the third traffic light $TL_3$ is located to face the first traffic light $TL_1$ in the driving direction of the host vehicle 10, and the fourth traffic light $TL_4$ is located to face the second traffic light $TL_2$ in the direction intersecting the driving direction of the host vehicle 10. That is, the first and third traffic lights $TL_1$ and $TL_3$ or the second and fourth traffic lights $TL_2$ and $TL_4$ face each other, and the first or third traffic light $TL_1$ or $TL_3$ and the second or fourth traffic light $TL_2$ or $TL_4$ intersect each other. However, this configuration is only exemplary, and it will be apparent to those having ordinary skill in the art that the number of traffic lights installed at the intersection may include a natural number which is less than or greater than 4.

Figure 3A:
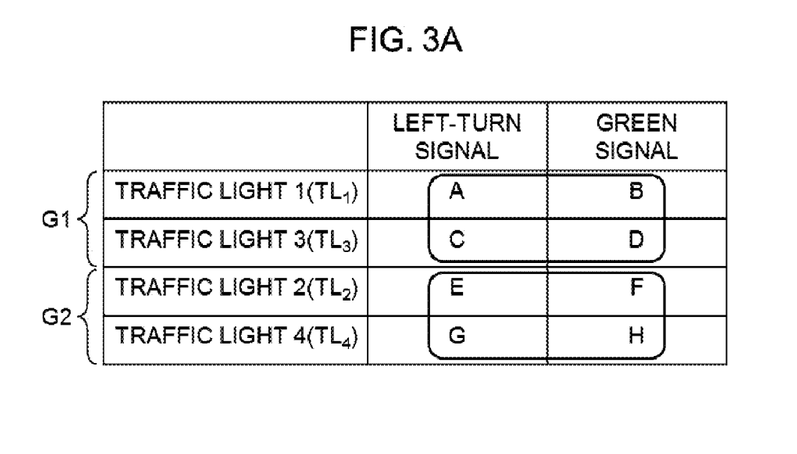
FIGS. 3A and 3B are views illustrating an algorithm for determining a signal error by comparing signal information of traffic lights intersecting each other according to one embodiment of the present invention.
Figure 3B:
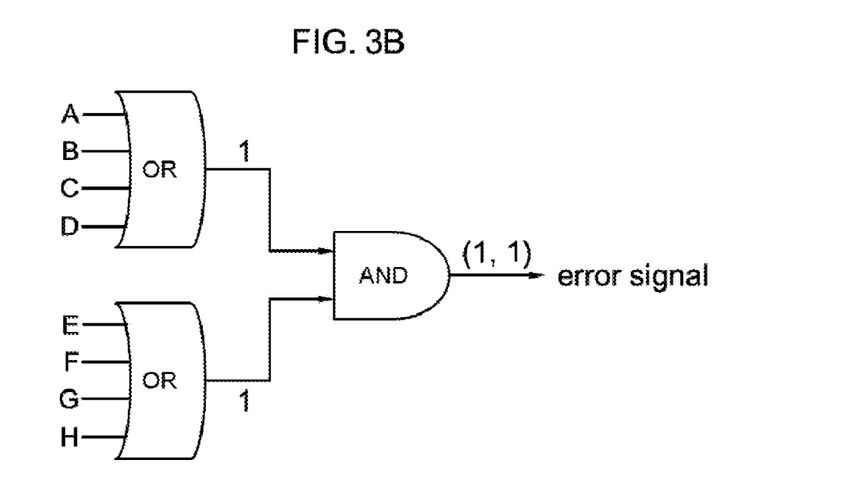

FIGS. 3A and 3B are views illustrating an algorithm for determining a signal error by comparing signal information of traffic lights intersecting each other according to one embodiment of the present invention.

Referring to FIG. 3A, the signal error determination unit 120 generates a traffic light DB by combining respective traffic light IDs and corresponding signal information in rows and columns based on the traffic light information acquired from the roadside equipment 30.

The signal error determination unit 120 groups the first and third traffic lights $TL_1$ and $TL_3$ which face each other in the driving direction of the host vehicle 10 into a first group G1, and groups the second and fourth traffic lights $TL_2$ and $TL_4$ which face each other in the direction intersecting the driving direction of the host vehicle 10 into a second group G2.

The signal error determination unit 120 collects signal states of the plurality of traffic lights which are turned on, from the traffic light infrastructure server 32, and matches signal information A to H, to which a signal value 1 or 0 is allocated depending on whether or not the left-turn signal and/or the green signal is turned on or off, with the respective traffic light IDs $TL_1$, $TL_2$, $TL_3$ and $TL_4$. For example, signal information A and B is allocated to the first traffic light $TL_1$, signal information C and D is allocated to the third traffic light $TL_3$, signal information E and F is allocated to the second traffic light $TL_2$, and signal information G and H is allocated to the fourth traffic light $TL_4$. Here, the signal information A, C, E and G indicate a digital signal value depending on whether or not the left-turn signal is turned on or off, the signal information B, D, F and H indicates a digital signal value depending on whether or not the green signal is turned on or off, and the signal information A to H has a value of 1 or 0.

Referring to FIG. 3B, the signal error determination unit 120 determines a signal error in the traffic lights intersecting each other based on the generated traffic light DB.

Based on the traffic light DB, when 1 is output as at least one of the signal information A, B, C and D of the traffic lights $TL_1$ and $TL_3$ belonging to the first group G1 and 1 is output as at least one of the signal information E, F, G and H of the traffic lights $TL_2$ and $TL_4$ belonging to the second group G2, the signal error determination unit 120 may determine that at least one of the traffic lights intersecting each other has a signal error.

That is to say, when at least one of the traffic lights $TL_1$ and $TL_3$ facing each other in the driving direction of the host vehicle 10 outputs the left-turn signal or the green signal and at least one of the traffic lights $TL_2$ and $TL_4$ facing each other in the direction intersecting the driving direction of the host vehicle 10 outputs the left-turn signal or the green signal, the signal error determination unit 120 determines that at least one of the traffic lights intersecting each other has a signal error.

Figure 4:
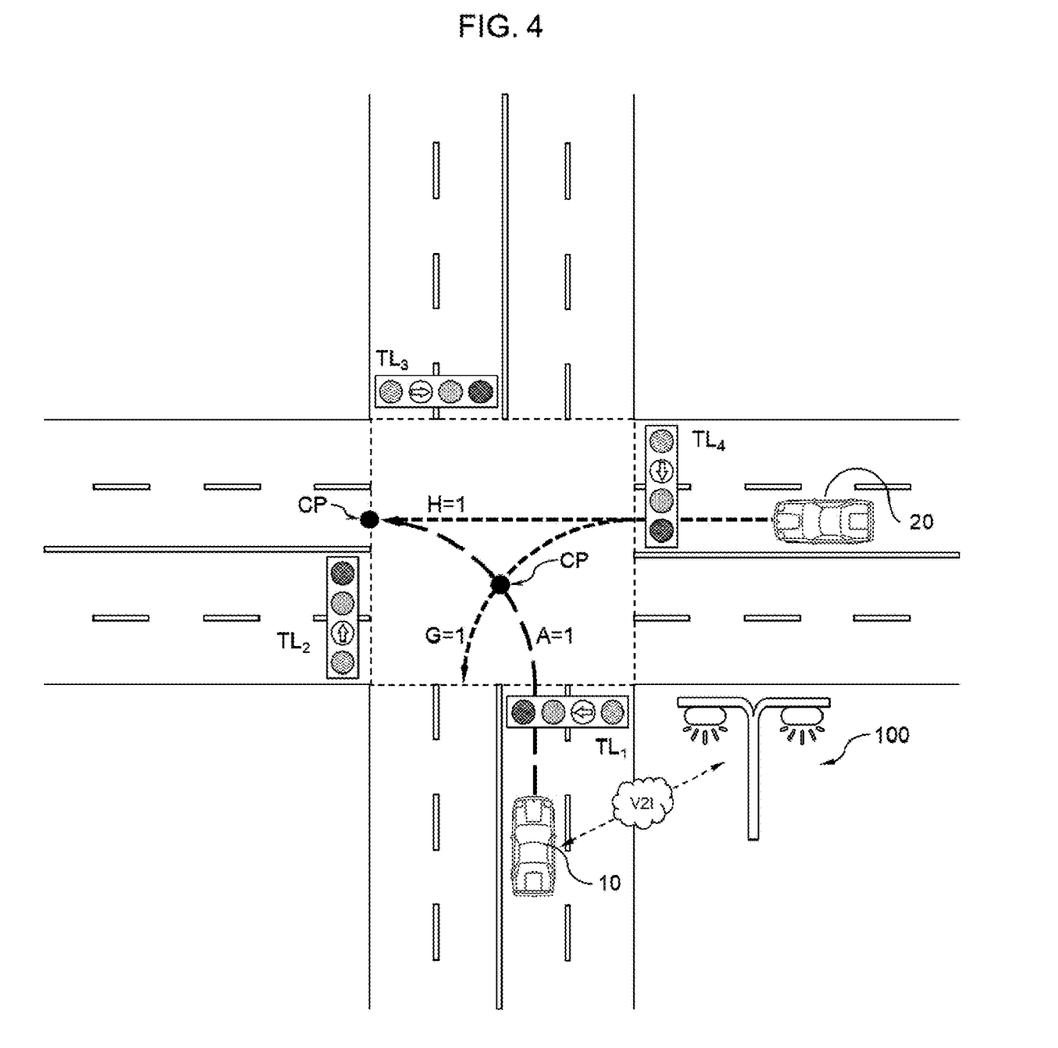
FIG. 4 is a view illustrating one example of determination of a signal error between the traffic lights intersecting each other in an intersection map based on a traffic light DB shown in FIGS. 3A and 3B.

FIG. 4 is a view illustrating one example of determination of a signal error between the traffic lights intersecting each other in the intersection map based on the traffic light DB shown in FIGS. 3A and 3B.

Referring to FIG. 4, as a result of extraction of the above-described traffic light DB, when (1, 0, 0, 0) is output as the signal information (A, B, C, D) of the traffic lights $TL_1$ and $TL_3$ belonging to the first group G1 (A=1) and (0, 0, 1, 0) or (0, 0, 0, 1) is output as the signal information (E, F, G, H) of the traffic lights $TL_2$ and $TL_4$ belonging to the second group G2 (G=1 or H=1), the signal error determination unit 120 determines that priority of passage for entering the intersection is not properly allocated between the host vehicle 10 and the peripheral vehicle 20, and transmits an error message to the path planner 130 and/or the output unit 140.

Further, the signal error determination unit 120 sends an error message of at least one of the first and fourth traffic lights $TL_1$ and $TL_4$ to the roadside equipment 30 and transmits a signal recovery command to the roadside equipment 30 through the communication unit no.

Figure 5A:
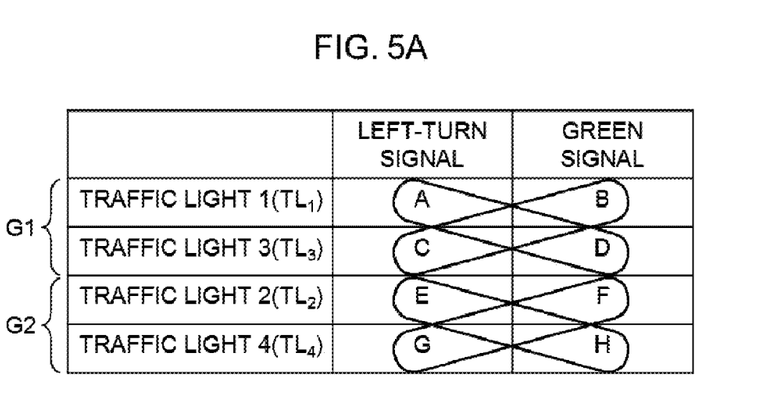
FIGS. 5A and 5B are views illustrating an algorithm for determining a signal error by comparing signal information of traffic lights facing each other according to another embodiment of the present invention.
Figure 5B:
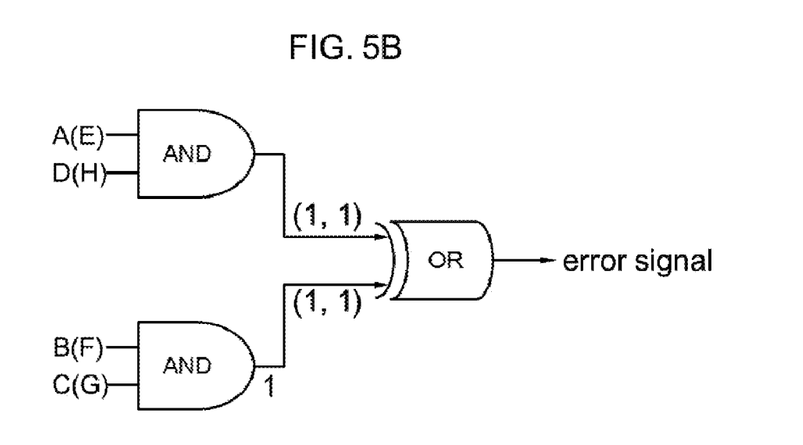

FIGS. 5A and 5B are views illustrating an algorithm for determining a signal error by comparing the signal information of the traffic lights facing each other according to another embodiment of the present invention.

Referring to FIG. 5A, the signal error determination unit 120 generates a traffic light DB by combining respective traffic light IDs and corresponding signal information in rows and columns based on the traffic light information acquired from the roadside equipment 30.

The signal error determination unit 120 groups the first and third traffic lights $TL_1$ and $TL_3$ which face each other in the driving direction of the host vehicle 10 into the first group G1, and groups the second and fourth traffic lights $TL_2$ and $TL_4$ which face each other in the direction intersecting the driving direction of the host vehicle 10 into the second group G2.

The signal error determination unit 120 collects signal states of the plurality of traffic lights which are turned on, from the traffic light infrastructure server 32, and matches signal information A to H, to which a value 1 or 0 is allocated depending on whether or not the left-turn signal and/or the green signal is turned on or off, with the respective traffic light IDs $TL_1$, $TL_2$, $TL_3$ and $TL_4$. For example, the signal information A and B is allocated to the first traffic light $TL_1$, the signal information C and D is allocated to the third traffic light $TL_3$, the signal information E and F is allocated to the second traffic light $TL_2$, and the signal information G and H is allocated to the fourth traffic light $TL_4$. Here, the signal information A, C, E and G indicates a digital signal value depending on whether or not the left-turn signal is turned on or off, the signal information B, D, F and H indicates a digital signal value depending on whether or not the green signal is turned on or off, and the signal information A to H has a value of 1 or 0.

Referring to FIG. 5B, the signal error determination unit 120 determines a signal error in the traffic lights facing each other based on the generated traffic light DB.

The signal error determination unit 120 determines a signal error in the traffic lights facing each other based on signal information of different traffic lights belonging to the same group G1 or G2, corresponding to different signal states (i.e., states of the left-turn signal and the green signal).

For example, in the determination of a signal error in at least one of the first and third lights $TL_1$ and $TL_3$ belonging to the first group G1, the signal error determination unit 120 regards the corresponding condition as being satisfied when a combination (A, D) of the signal information A of the first traffic light $TL_1$ corresponding to the left-turn signal and the signal information D of the third traffic light $TL_3$ corresponding to the green signal is (1, 1) or when a combination (B, C) of the signal information B of the first traffic light $TL_1$ corresponding to the green signal and the signal information C of the third traffic light $TL_3$ corresponding to the left-turn signal is (1, 1).

Further, in the determination of a signal error in at least one of the second and fourth lights $TL_2$ and $TL_4$ belonging to the second group G2, the signal error determination unit 120 regards the corresponding condition as being satisfied when a combination (E, H) of the signal information E of the second traffic light $TL_2$ corresponding to the left-turn signal and the signal information H of the fourth traffic light $TL_4$ corresponding to the green signal is (1, 1) or when a combination (F, G) of the signal information F of the second traffic light $TL_2$ corresponding to the green signal and the signal information G of the fourth traffic light $TL_4$ corresponding to the left-turn signal is (1, 1).

That is to say, when at least one of the first and third traffic lights $TL_1$ and $TL_3$ facing each other in the driving direction of the host vehicle 10 outputs the left-turn signal and the remaining one outputs the green signal, the signal error determination unit 120 determines that at least one of the first and third traffic lights $TL_1$ and $TL_3$ facing each other has a signal error. Otherwise, when at least one of the second and fourth traffic lights $TL_2$ and $TL_4$ facing each other in the direction intersecting the driving direction of the host vehicle 10 outputs the left-turn signal and the remaining one outputs the green signal, the signal error determination unit 120 determines that at least one of the second and fourth traffic lights $TL_2$ and $TL_4$ has a signal error.

Figure 6:
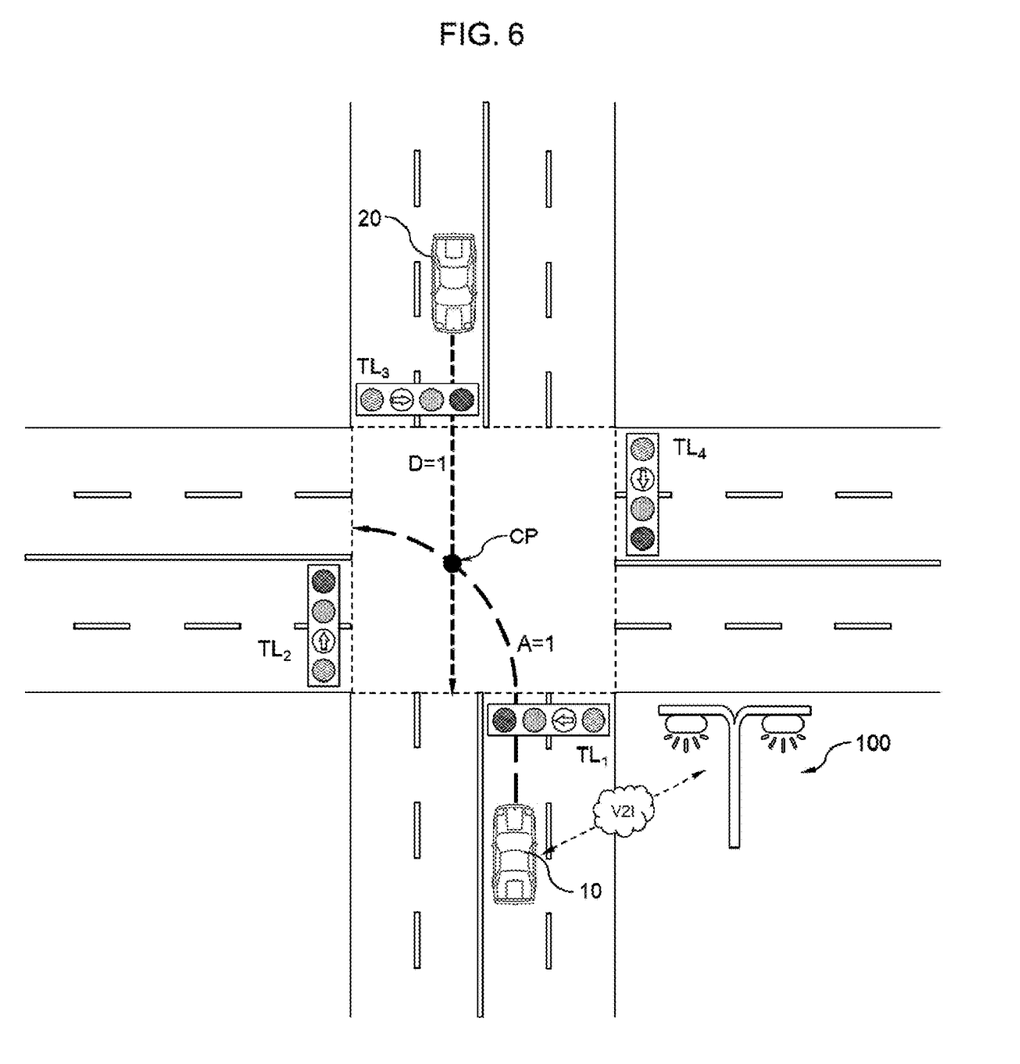
FIG. 6 is a view illustrating one example of determination of a signal error between the traffic lights facing each other in an intersection map based on a traffic light DB shown in FIGS. 5A and 5B.

FIG. 6 is a view illustrating one example of determination of a signal error between the traffic lights facing each other in the intersection map based on the traffic light DB shown in FIGS. 5A and 5B.

Referring to FIG. 6, as a result of extraction of the above-described traffic light DB, when (1, 1) is output as the combination (A, D) of the signal information A of the first traffic light $TL_1$ corresponding to the left-turn signal and the signal information D of the third traffic light $TL_3$ corresponding to the green signal (A=1 and D=1), the signal error determination unit 120 determines that priority of passage for entering the intersection is not properly allocated between the host vehicle 10 and the peripheral vehicle 20, and transmits an error message to the path planner 130 and/or the output unit 140.

Further, the signal error determination unit 120 sends an error message of at least one of the first and third traffic lights $TL_1$ and $TL_3$ to the roadside equipment 30 and transmits a signal recovery command to the roadside equipment 30 through the communication unit no.

Referring to FIG. 2 again, when the path planner 130 receives the error message from the signal error determination unit 120, the path planner 130 may receive path information of the peripheral vehicles 20 approaching the intersection, and generate an alternative path or an emergency path for bypassing the intersection by analyzing the possibility of a collision between the host vehicle 10 and the peripheral vehicles 20 based on the path information of the peripheral vehicles 20.

The path planner 130 recognizes the peripheral vehicles 20 approaching the intersection based on the path information acquired from the roadside equipment 30, and calculates respective intersection arrival times of the host vehicle 10 and the peripheral vehicles 20 based on position and speed information of the host vehicle 10 and the peripheral vehicles 20. Here, the path information means local paths in some sections for passing through the intersection among global paths of the peripheral vehicles 20 approaching the intersection.

The path planner 130 calculates a distance from the host vehicle 10 to the intersection based on the position information of the host vehicle 10 and the position information of the intersection included in the road information acquired from the roadside equipment 30, and calculates the intersection arrival time of the host vehicle 10 by dividing the calculated distance by the speed of the host vehicle 10.

The path planner 130 calculates distances from the peripheral vehicles 20 to the intersection based on the position information of the peripheral vehicles 20 and the position information of the intersection included in the road information acquired from the roadside equipment 30, and calculates the intersection arrival times of the peripheral vehicles 20 by dividing the calculated distances by the speeds of the peripheral vehicles 20 approaching the intersection.

The path planner 130 may calculate differences between the intersection arrival time of the vehicle 10 and the intersection arrival times of the peripheral vehicles 20 when the intersection arrival time of the vehicle 10 and the intersection arrival times of the peripheral vehicles 20 are calculated, and predict a collision situation between the vehicle 10 and the peripheral vehicle 20 and search for a point at which to bypass the intersection when the difference between the intersection arrival time of the vehicle 10 and the intersection arrival time of the peripheral vehicle 20 is a predetermined reference value or less. Here, the point at which to bypass the intersection may include a point in the intersection at which the host vehicle 10 may make at least one of an unprotected U-turn or a right-turn.

Further, the path planner 130 may acquire information about the road along which the host vehicle 10 is currently driving through the GPS receiver 150 and the precise map DB 160 mounted in the host vehicle 10, and set an alternative path along which the host vehicle 10 may be driven to a predetermined destination by searching for a point at which to bypass the intersection adjacent to the host vehicle 10 in consideration of the road information and path costs. Here, the path costs may conceptually include the shortest time or the minimum driving time needed for the host vehicle 10 to move from the current position to the point at which to bypass the intersection.

As such, the autonomous driving system 100 according to embodiments of the present invention autonomously determines an error in signal information of traffic signals applied through V2X communication, searches for a point at which to bypass an intersection and thus generates an alternative path, thereby being capable of preventing a collision with a peripheral vehicle caused by passing through the intersection and thus improving stability or reliability of the host vehicle 10.

The path planner 130 may determine whether or not the host vehicle 10 is movable to the searched point at which to bypass the intersection based on the driving information of the peripheral vehicles 20 acquired through the V2V interface (not shown), and, upon determining that the host vehicle 10 is not movable to the searched point at which to bypass the intersection, generate an emergency path by changing the predetermined destination to a safety zone. Here, the driving information of the peripheral vehicles 20 may be acquired using an image sensor (not shown) and/or a distance sensor (not shown) mounted in the host vehicle 10.

The output unit 140 may output visual information, auditory information and/or tactile information, and include a display, a sound output module and/or a haptic module.

For example, the output unit 140 may output an error message received from the signal error determination unit 120 through a voice signal, and display an alternative path and/or an emergency path output through the path planner 130 so as to overlap with the precise map.

Hereinafter, a method for determining a signal error in traffic lights installed at an intersection and generating an alternative path in response to the signal error will be described with reference to FIGS. 7 and 8.

Figure 7:
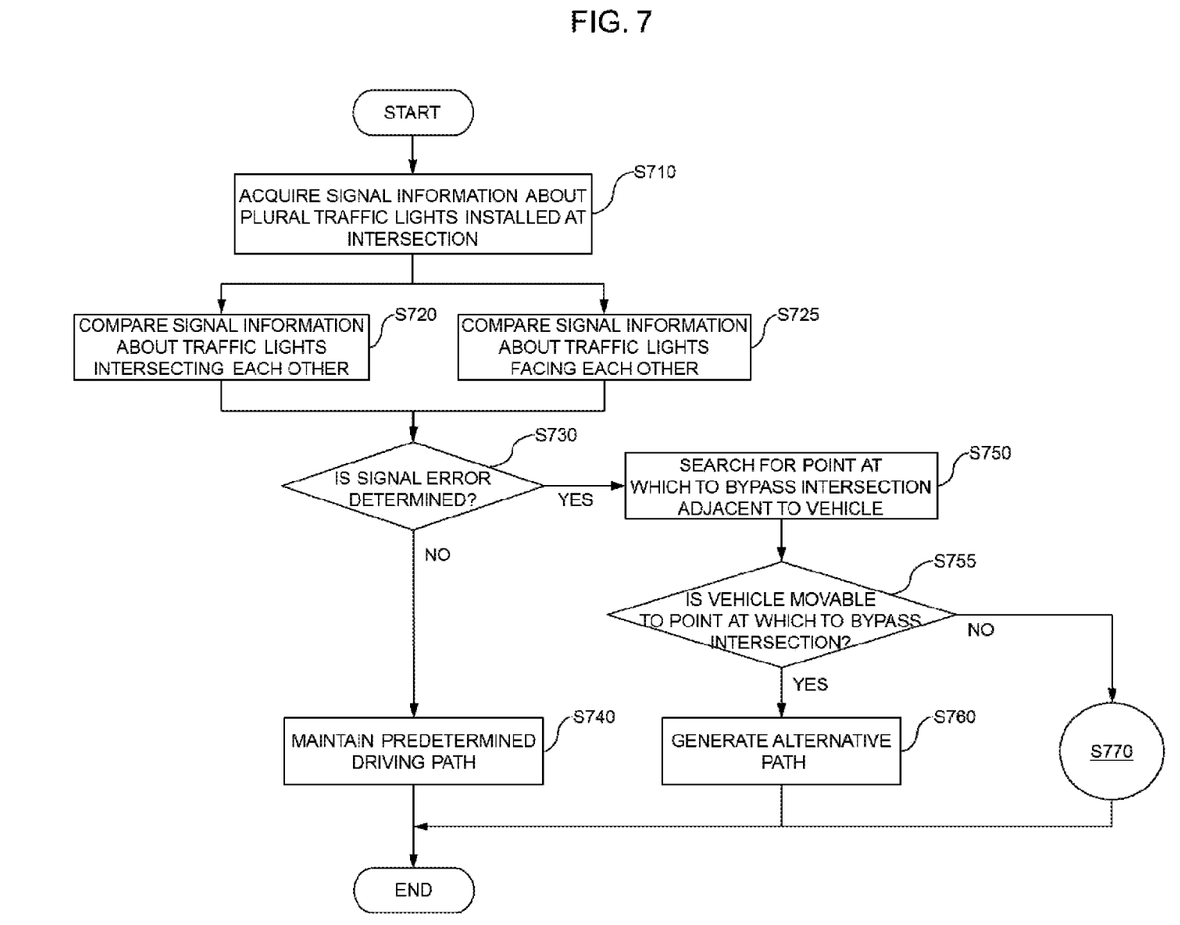
FIG. 7 is a flowchart illustrating an autonomous driving method of a vehicle using V2X communication according to one embodiment of the present invention.

FIG. 7 is a flowchart illustrating an autonomous driving method of a vehicle using V2X communication according to one embodiment of the present invention.

Referring to FIG. 7, the autonomous driving method according to one embodiment may include acquiring signal information about a plurality of traffic lights installed at an intersection (S710), comparing signal information about at least two traffic lights intersecting or facing each other (S720 or S725), determining whether there is a signal error in at least one of the plurality of traffic lights based on a result of the comparison (S730), and resetting a driving path of the vehicle depending on a result of the determination (S740, S760, or S770).

In Operation S710, the autonomous driving system 100 may acquire traffic light information, an intersection map (including road information), path information of the peripheral vehicles 20 approaching the intersection, etc. from the roadside equipment 30 through the communication interface which supports V2X communication. Here, the traffic light information may include IDs and kinds (i.e., a longitudinal type, a transverse type, a three-way type, a four-way type, etc.) of the traffic lights corresponding to entry directions to the intersection, and signal states of the traffic lights which are turned on (i.e., a red signal, a yellow signal, a left-turn signal, a green signal, etc.), and the intersection map may include road information, including road position information, road shape information, progress direction information, intersection information, road width information, speed limit information, etc.

Hereinafter, the autonomous driving system 100 may compare the signal information of the traffic lights intersecting or facing each other among the plurality of traffic lights acquired from the roadside equipment 30 by performing Operation S720 and Operation S725 sequentially or in parallel. For this purpose, the autonomous driving system 100 may construct a traffic light DB in which the acquired traffic light IDs and the corresponding signal information thereof are arranged in rows and columns.

Thereafter, in Operation S730, the autonomous driving system 100 may determine whether there is a signal error in at least one of the plurality of traffic lights installed at the intersection depending on a predetermined algorithm based on the traffic light DB. Here, the signal error means a state in which priority of passage is not properly allocated between vehicles entering the intersection and thus there is a high possibility that a collision may occur.

The comparison between the signal information of the traffic lights (S720 and S725) and the determination of the signal error thereby (S730) were described above with reference to FIG. 3A to FIG. 6, and a detailed description thereof will thus be omitted.

Thereafter, as a result of the determination in FIG. 730, upon determining that there is no signal error in any of the plurality of traffic lights installed at the intersection (NO in S730), the autonomous driving system 100 may pass through the intersection while maintaining the predetermined driving path (S740).

On the other hand, upon determining that there is a signal error in at least one of the plurality of traffic lights installed at the intersection (YES in S730), the autonomous driving system 100 may receive path information of the peripheral vehicles 20 approaching the intersection, and may search for a point at which to bypass the intersection adjacent to the vehicle 10 by analyzing the possibility of a collision between the vehicle 10 and the peripheral vehicles 20 based on the path information of the peripheral vehicles 20 (S750). Here, the point at which to bypass the intersection may include a point in the intersection at which the vehicle may make at least one of an unprotected U-turn or a right-turn.

Thereafter, the autonomous driving system 100 may acquire the driving information of the peripheral vehicles 20 through a V2V interface (not shown), and determine whether or not the vehicle is movable to the searched point at which to bypass the intersection based on the driving information of the peripheral vehicles 20 (S755). Here, the driving information of the peripheral vehicles 20 may be acquired using an image sensor (not shown) and/or a distance sensor (not shown) mounted in the vehicle.

Upon determining that the vehicle is movable to the point at which to bypass the intersection (YES in S755), the autonomous driving system 100 may generate an alternative path for bypassing the intersection via the point at which to bypass the intersection (S760).

On the other hand, upon determining that the vehicle is not movable to the point at which to bypass the intersection (NO in S755), Operation S770 is performed. Operation S770 will be described below with reference to FIG. 8.

Figure 8:
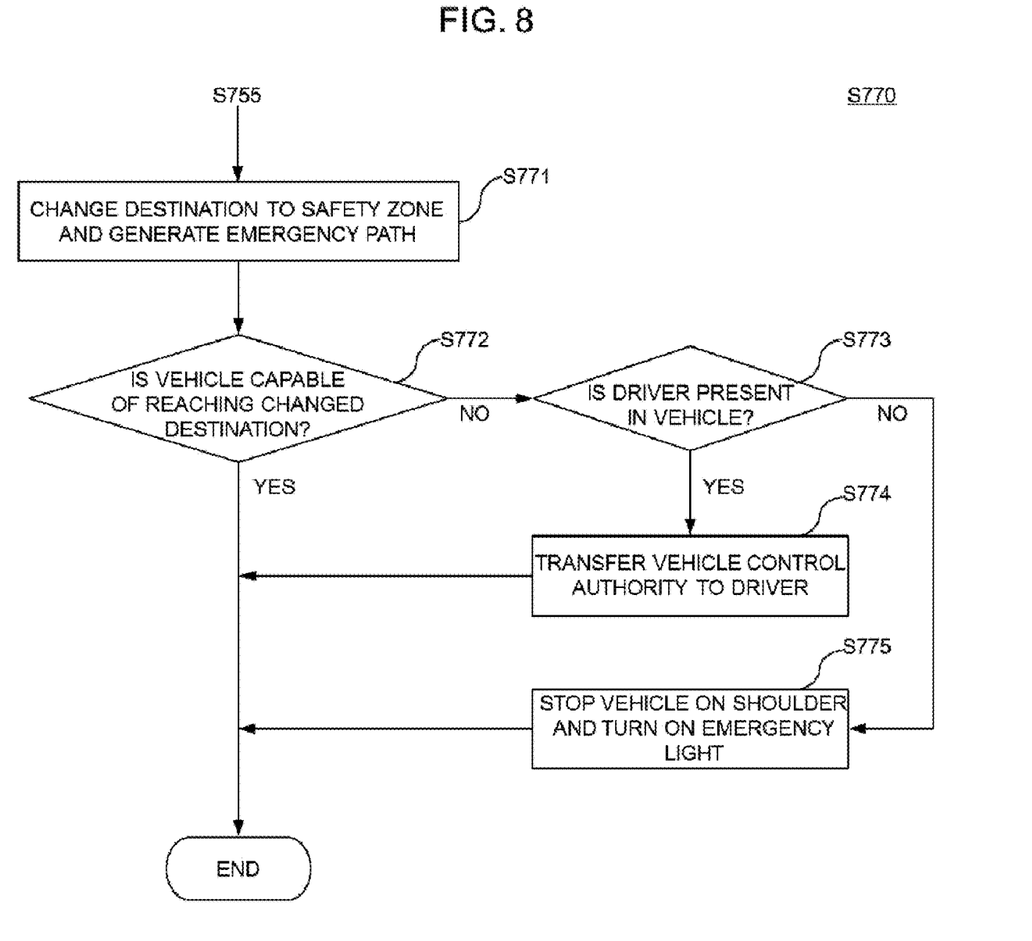
FIG. 8 is a flowchart illustrating a method for generating an emergency path shown in FIG. 7.

FIG. 8 is a flowchart illustrating a method for generating the emergency path shown in FIG. 7.

First, upon determining that the vehicle is not movable to the searched point at which to bypass the intersection (NO in S755), the autonomous driving system 100 may change a destination to a safety zone and generate an emergency path (S771). Here, the safety zone means a portion of a road which is indicated by a safety sign or an artificial structure for vehicle safety set by the Road Traffic Law.

Thereafter, the autonomous driving system 100 may determine whether or not the vehicle is capable of reaching the changed destination (i.e., the safety zone) (S772).

Upon determining that the vehicle is incapable of reaching the changed destination (NO in S772), the autonomous driving system 100 detects whether or not a driver is present in the vehicle using a biological signal recognition sensor (not shown) or the like (S773). When a driver is detected in the vehicle (YES in S773), the autonomous driving system 100 transfers vehicle control authority to the driver (S774). On the other hand, when no driver is detected in the vehicle (NO in S773), the autonomous driving system 100 may stop the vehicle on the shoulder and then turn on an emergency light (S775).

The above-described autonomous driving method according to one embodiment may be recorded as a program which may be executed in computers and be stored in a computer readable recording medium and, for example, computer readable recording media may include a ROM, a RAM, a CD-ROM, a magnetic tape, a floppy disk, an optical data storage device, etc.

The computer readable recording media may be distributed to computer systems connected by a network and, herein, computer readable code may be stored and executed in a distributed manner. Further, functional programs, code and code segments to implement the above-described method may be easily deduced by programmers in the art to which the embodiments pertain.

As is apparent from the above description, in an autonomous driving system and method of a vehicle according to at least one embodiment of the present invention autonomously determines an error in signal information of traffic lights applied through V2X communication, searches for a point at which to bypass an intersection and thus generates an alternative path, thereby being capable of preventing a collision with a peripheral vehicle caused by passing through the intersection and thus improving stability or reliability of the vehicle.

While the invention has been explained in relation to the embodiments thereof, it will be understood that various modifications thereof will become apparent to those skilled in the art upon reading the specification. The technical content of the above-described embodiments may be combined in various ways unless it is mutually incompatible, and thereby, new embodiments may be implemented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An autonomous driving method of a vehicle using V2X communication, the method comprising:
   acquiring signal information about a plurality of traffic lights installed at an intersection;
   determining a signal error in at least one of the plurality of traffic lights by comparing signal information about at least two traffic lights intersecting or facing each other among the acquired signal information, wherein determining the signal error comprises determining the signal error when a first one of the plurality of traffic lights facing each other in a driving direction of a host vehicle outputs a left-turn signal and a second one of the plurality of traffic lights facing each other in the driving direction of the host vehicle outputs a green signal; and
   resetting a driving path of the host vehicle depending on a result of the determination.

2. The method according to claim 1, wherein determining the signal error comprises determining the signal error when at least one of the plurality of traffic lights facing each other in a driving direction of the host vehicle outputs a green signal or a left-turn signal and at least one of the plurality of traffic lights facing each other in a direction intersecting the driving direction of the host vehicle outputs the green signal or the left-turn signal.

3. The method according to claim 1, wherein acquiring the signal information comprises receiving the signal information from roadside equipment around the host vehicle through the V2X communication.

4. The method according to claim 3, wherein resetting the driving path of the host vehicle comprises:
   receiving path information of one or more peripheral vehicles approaching the intersection, when the signal error in the at least one of the plurality of traffic lights is determined;
   analyzing a possibility of a collision between the host vehicle and at least one of the one or more peripheral vehicles based on the received path information of the one or more peripheral vehicles; and
   generating an alternative path for bypassing the intersection.

5. The method according to claim 4, wherein generating the alternative path comprises:
   acquiring information about a road along which the host vehicle is currently driving through a GPS receiver and a precise map database mounted in the host vehicle; and
   resetting a path along which the host vehicle is capable of being driven to a predetermined destination by searching for a point at which to bypass the intersection adjacent to the host vehicle based on the acquired information about the road.

6. The method according to claim 5, wherein the point at which to bypass the intersection comprises a point in the intersection at which the host vehicle is capable of making either an unprotected U-turn or a right-turn.

7. The method according to claim 5, further comprising generating an emergency path by changing the predetermined destination to a safety zone, when the host vehicle is not movable to the searched point at which to bypass the intersection.

8. A non-transitory computer readable recording medium having recorded thereon an application program, which when executed by a processor, causes the processor to perform the autonomous driving method according to claim 1.

9. An autonomous driving method of a vehicle using V2X communication, the method comprising:
   acquiring signal information about a plurality of traffic lights installed at an intersection;
   determining a signal error in at least one of the plurality of traffic lights by comparing signal information about at least two traffic lights intersecting or facing each other among the acquired signal information, wherein determining the signal error comprises determining the signal error when a first one of the plurality of traffic lights facing each other in a direction intersecting a driving direction of a host vehicle outputs a left-turn signal and a second one of the plurality of traffic lights facing each other in the direction intersecting the driving direction of the host vehicle outputs a green signal; and
   resetting a driving path of the host vehicle depending on a result of the determination.

10. The method according to claim 9, wherein acquiring the signal information comprises receiving the signal information from roadside equipment around the host vehicle through the V2X communication.

11. The method according to claim 10, wherein resetting the driving path of the host vehicle comprises:
    receiving path information of one or more peripheral vehicles approaching the intersection, when the signal error in the at least one of the plurality of traffic lights is determined;
    analyzing a possibility of a collision between the host vehicle and at least one of the one or more peripheral vehicles based on the received path information of the one or more peripheral vehicles; and
    generating an alternative path for bypassing the intersection.

12. The method according to claim 11, wherein generating the alternative path comprises:
    acquiring information about a road along which the host vehicle is currently driving through a GPS receiver and a precise map database mounted in the host vehicle; and
    resetting a path along which the host vehicle is capable of being driven to a predetermined destination by searching for a point at which to bypass the intersection adjacent to the host vehicle based on the acquired information about the road.

13. An autonomous driving system of a vehicle using V2X communication, the system comprising:
    a communication unit configured to acquire signal information about a plurality of traffic lights installed at an intersection;
    a signal error determination unit configured to determine a signal error in at least one of the plurality of traffic lights by comparing signal information about at least two traffic lights intersecting or facing each other among the acquired signal information, wherein the signal error determination unit is configured to determine the signal error when a first one of the plurality of traffic lights facing each other in a driving direction of a host vehicle outputs a left-turn signal and a second one of the plurality of traffic lights facing each other in the driving direction of the host vehicle outputs a green signal; and
a path planner configured to reset a driving path of the host vehicle depending on a result of the determination.

14. The system according to claim 13, wherein the signal error determination unit is configured to determine the signal error when at least one of the plurality of traffic lights facing each other in a driving direction of the host vehicle outputs a green signal or a left-turn signal and at least one of the plurality of traffic lights facing each other in a direction intersecting the driving direction of the host vehicle outputs the green signal or the left-turn signal.

15. The system according to claim 13, wherein the signal error determination unit is configured to determine the signal error when a first one of the plurality of traffic lights facing each other in a direction intersecting a driving direction of the host vehicle outputs a left-turn signal and a second one of the plurality of traffic lights facing each other in the direction intersecting the driving direction of the host vehicle outputs a green signal.

16. The system according to claim 13, wherein the communication unit is configured to receive the signal information from roadside equipment around the host vehicle through the V2X communication.

17. The system according to claim 16, wherein the path planner is configured to:

receive path information of one or more peripheral vehicles approaching the intersection, when the signal error in the at least one of the traffic lights is determined;
analyze a possibility of a collision between the host vehicle and at least one of the one or more peripheral vehicles based on the received path information of the one or more peripheral vehicles; and
generate an alternative path for bypassing the intersection.

18. The system according to claim 17, wherein the path planner is configured to:

acquire information about a road along which the host vehicle is currently driving through a GPS receiver and a precise map database mounted in the host vehicle; and
reset a path along which the host vehicle is capable of being driven to a predetermined destination by searching for a point at which to bypass the intersection adjacent to the host vehicle based on the acquired information about the road.

19. The system according to claim 18, wherein the point at which to bypass the intersection comprises a point in the intersection at which the host vehicle is capable of making either an unprotected U-turn or a right-turn.

20. The system according to claim 18, wherein the path planner is configured to generate an emergency path by changing the predetermined destination to a safety zone, when the host vehicle is not movable to the searched point at which to bypass the intersection.

\* \* \* \* \*